UNITED STATES PATENT OFFICE.

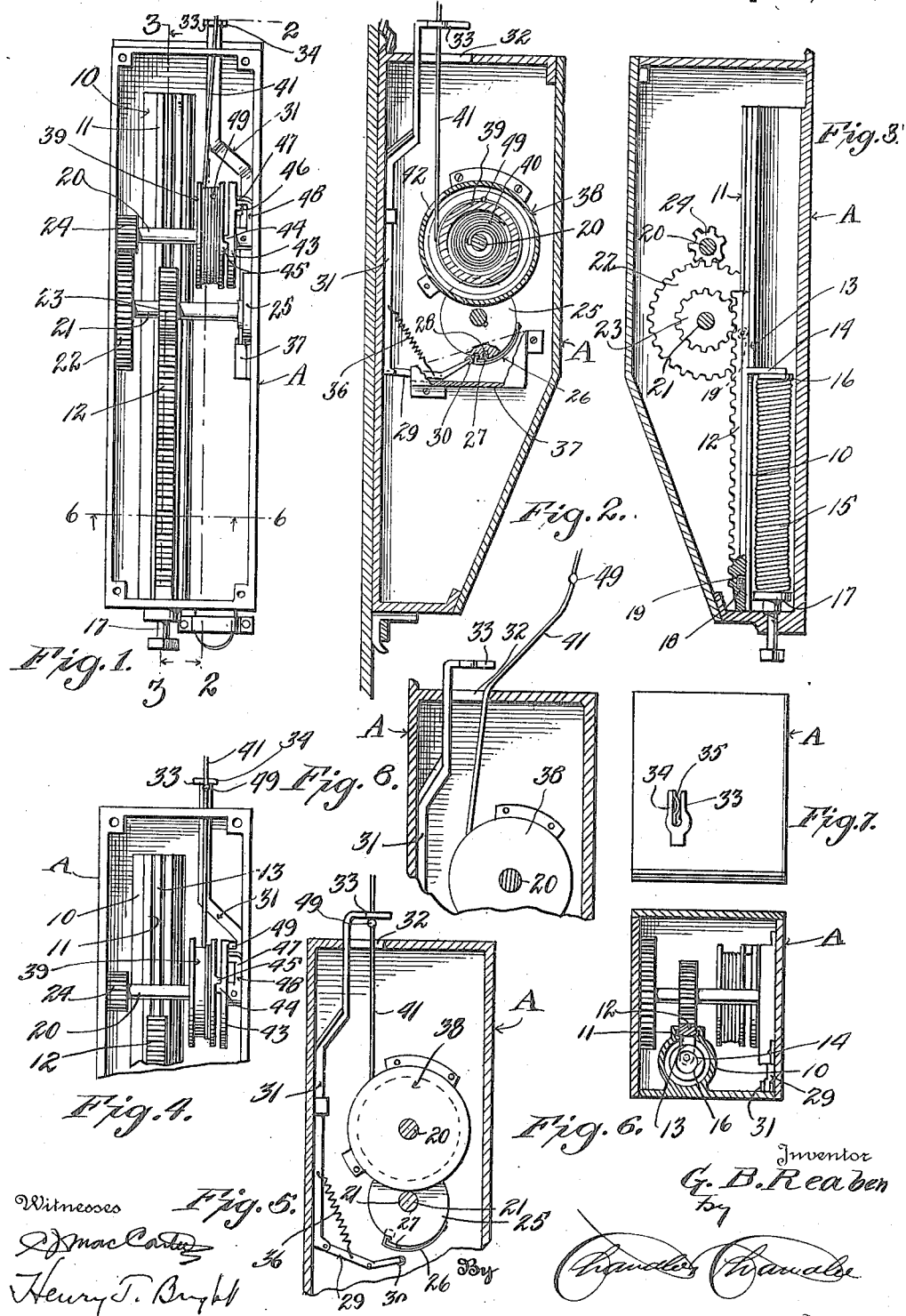

GEORGE B. REABEN, OF HATTIESBURG, MISSISSIPPI.

TROLLEY-RETRIEVER.

1,135,845.
Specification of Letters Patent.
Patented Apr. 13, 1915.

Application filed January 30, 1914. Serial No. 815,456.

*To all whom it may concern:*

Be it known that I, GEORGE B. REABEN, a citizen of the United States, residing at Hattiesburg, in the county of Forrest, State of Mississippi, have invented certain new and useful Improvements in Trolley-Retrievers; and I do hereby declare the following to be a full, clear, and exact description of the invention, such as will enable others skilled in the art to which it appertains to make and use the same.

This invention relates to trolley retrievers.

The object of the invention resides in the provision of a device of the character named which will automatically operate when the trolley leaves the wire to pull the free end of the trolley to lowered position whereby possibility of damage to the trolley pole and to the trolley wire and its supporting structure is obviated.

A further object of the invention resides in the provision of a device of the character named embodying an improved construction whereby the movement of the trolley in following the wire during its normal operation is in no way interfered with, it being necessary for the free end of the trolley to partake of an abnormal upward movement in order to automatically operate the device to lower the free end of the pole.

A still further object of the invention resides in the provision of a trolley retriever which will be simple in construction, efficient in use, and which may be manufactured and installed at a very small cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a front elevation of a trolley retriever constructed in accordance with the invention, the front wall of the casing of the device being removed to expose the mechanism to view; Fig. 2, a section on the line 2—2 of Fig. 1; Fig. 3, a section on the line 3—3 of Fig. 1; Fig. 4, a fragment of what is shown in Fig. 1 with the parts in the position they would occupy when the free end of the trolley has reached the limit of its normal upward movement and just before the trigger of the device has been actuated to effect the lowering of the trolley; Fig. 5, a view similar to Fig. 2 showing the trigger in tripped position; Fig. 6, a section on the line 6—6 of Fig. 1; Fig. 7, a top view of the device disclosing the spring which normally holds the trolley rope in operative relation to the trigger, and Fig. 8, a view similar to Fig. 5 showing the trolley rope disengaged from the trigger for the purpose of resetting the device.

Referring to the drawings the invention is shown as comprising a casing A which is adapted to be secured to either dash of a trolley car in any suitable manner.

Mounted upon the inner side of the wall of the casing A which is secured next to the dash is a barrel or cylinder 10 which has formed thereon a guide way 11 having slidably mounted therein a rack bar 12. The cylinder 10 is slotted as at 13 at the base of the guide way 11 throughout the length of said cylinder and the rack bar 12 is provided with a lateral extension 14 which projects through said slot 13 into the cylinder.

Disposed within the cylinder 10 is a spring 15 the upper end of which abuts a follower plate 16 and this plate in turn abuts the extension 14. The lower end of the spring 15 abuts one end of an adjusting screw 17 suitably mounted in the bottom of the casing A and whereby the tension of the spring 15 may be varied. The underside of the rack bar 12 is transversely recessed as at 18 and mounted in these recesses respectively are roller bearings 19 which engage the base of the guide way 11 and facilitate the easy movement of the rack bar in said guide way.

Rotatably mounted in the side walls of the casing A are upper and lower shafts 20 and 21.

Fixed on the lower shaft 21 is a gear 22 and a pinion 23, the latter meshing with the rack bar 12.

Fixed on the upper shaft 20 is a gear 24 which meshes with the gear 22 whereby the rotation of the shaft 21 will effect the rotation of the shaft 20.

Fixed on the end of the shaft 21 remote from the gear 22 is a disk 25 which has mounted on its periphery a catch finger 26 normally thrown outwardly at its free end by a spring 27 seated in a recess 28 also formed in the periphery of said disk.

Pivotally mounted on the side wall of the casing A adjacent the disk 25 is an angle lever 29 one end of which carries a roller 30 adapted to engage the free end of the finger 26 to lock the disk 25 and shaft 21 against rotation.

Pivotally connected to the end of the lever 29 remote from the roller 30 is one end of a trigger 31. This trigger extends through an opening 32 formed in the top of the casing A and has its upper end directed laterally and forked to form arms 33 and 34.

Secured to the inner side of the arm 34 is a retaining leaf spring 35 for a purpose that will presently appear. The trigger 31 and lever 29 are connected by a spring 36 which constantly tends to hold the trigger and lever in the position shown in Fig. 2. The lever 29 and disk 25 are protected by a guard 37 secured to the adjacent side wall of the casing A.

Secured to the side wall of the casing A adjacent the disk 25 is a casing 38 pierced by the shaft 20.

Loosely mounted on the shaft 20 within the casing 38 is a hollow winding drum 39 and confined within this drum is a spiral spring 40 one end of which is anchored to the shaft 20 and the other end to the drum 39, said spring being adapted to be wound up by rotation of the drum in one direction as will be obvious.

Wound upon the drum 38 is the trolley rope 41 which extends through an opening 42 in the casing 38 and also through the opening 32 and between the arms 33 and 34 of the trigger, same being held against disengagement from the trigger by the spring 35. Also loosely mounted upon the shaft 20 within the casing 38 and between the drum 39 and the wall of the casing adjacent the disk 25 is a disk 43 provided with a lateral stud 44 adapted to coöperate with a lateral stud 45 formed on the adjacent side of the drum 39. The disk 43 is also provided with a lateral stud 46 disposed oppositely to the stud 44 and adapted to coöperate with the laterally directed free end 47 of an arm 48 fixed upon the shaft 20.

Assuming the parts to be in the position shown in Figs. 1, 2 and 3 it will be obvious that the spring 15 will be compressed and the shafts 20 and 21 locked against rotation by engagement of the lever 29 with the finger 26. It will be noted that the trolley rope 41 is provided with an enlargement 49 normally disposed between the drum 39 and the fingers 33 and 34, said enlargement of the trolley rope being of a size to prevent the passage thereof between the arms 33 and 34. During the normal upward movement of the trolley the drum 39 will be rotated and the spring 40 wound up so that when a normal downward movement of the trolley takes place the drum 39 will be rotated in the opposite direction to take up resultant slack in the trolley rope 41. In paying out the trolley rope 41 under normal upward movement of the trolley the drum 38 is capable of two complete revolutions. The first complete revolution of the drum will bring the stud 45 into engagement with the stud 44 when the drum and disk 43 will rotate in unison for another complete revolution until the stud 46 engages the laterally directed free end 47 of the arm 48. At this point in the rotation of the drum 39 the free end of the trolley pole shall have moved upwardly sufficient to bring the enlargement 49 into engagement with the arms 33 and 34. Further upward movement of the trolley pole will then elevate the trigger 31 and disengage the lever 29 from the finger 26 when the spring 15 will operate to raise the rack bar 12. This movement of the rack bar will of course rotate the shafts 21 and 20 and in turn rotate the drum 39 to wind up the trolley rope 41 and lower the trolley pole. To reset the device it is only necessary to disengage the trolley rope 41 from between the arms 33 and 34 and unwind the trolley rope from the drum which will effect the necessary rotation of the shafts 20 and 21 to return the rack bar 12 to the full line position in Fig. 3 when the lever 29 will engage the finger 26 and lock the parts until the free end of the trolley pole again partakes of abnormal upward movement.

What is claimed is:—

1. In a trolley retriever the combination of a support, a shaft rotatably mounted on said support, a drum loosely mounted on said shaft, a trolley rope wound upon said drum, means for locking the shaft to the drum for rotation therewith when said shaft is rotated in one direction, and means operable upon a predetermined unwinding movement of the trolley rope for rotating the shaft in a direction to operate the drum and wind the trolley rope thereon.

2. In a trolley retriever, the combination of a support, a shaft rotatably mounted on said support, a drum loosely mounted on said shaft, a trolley rope wound upon said drum, means for limiting the rotation of the drum on said shaft under the influence of unwinding movement of the trolley rope, automatic means for rotating the drum to take up slack in the trolley rope, means for locking the shaft to the drum for rotation therewith when said shaft is rotated in one direction, and means operable upon a predetermined unwinding movement of the trolley rope for rotating the shaft in a direction to operate the drum and wind the trolley rope thereon.

3. In a trolley retriever, the combination of a support, a shaft rotatably mounted on said support, a drum loosely mounted on the shaft, a trolley rope wound upon said drum, means for locking the drum to the shaft for rotation with the latter when said shaft is rotated in one direction, a rack bar slidably mounted on said support, connections between the rack bar and the shaft whereby the movement of the rack bar in one direction will operate the shaft to rotate the drum and wind the trolley rope thereon, and means operable upon a predetermined unwinding movement of the trolley rope to move the rack bar.

4. In a trolley retriever, the combination of a support, a shaft rotatably mounted on said support, a drum loosely mounted on said shaft, a trolley rope wound upon said drum, means for locking the drum to the shaft for rotation with the latter when said shaft is rotated in one direction, a rack bar slidably mounted upon said support, connections between the rack bar and the shaft whereby movement of the rack bar in one direction will operate the shaft to rotate the drum and wind the trolley rope thereon, spring means constantly tending to move the rack bar to operate the shaft, means for locking the rack bar against movement under the influence of said spring means, and a tripping mechanism operable upon a predetermined unwinding movement of the trolley rope for releasing said rack bar to the influence of said spring means.

In testimony whereof, I affix my signature, in the presence of two witnesses.

GEORGE B. REABEN.

Witnesses:
  J. H. SIGGERS,
  GEO. H. CHANDLEE.

Copies of this patent may be obtained for five cents each, by addressing the "Commissioner of Patents, Washington, D. C."